Feb. 14, 1933.   H. E. ALTGELT   1,897,355
AGRICULTURAL IMPLEMENT
Filed May 19, 1930   2 Sheets-Sheet 2
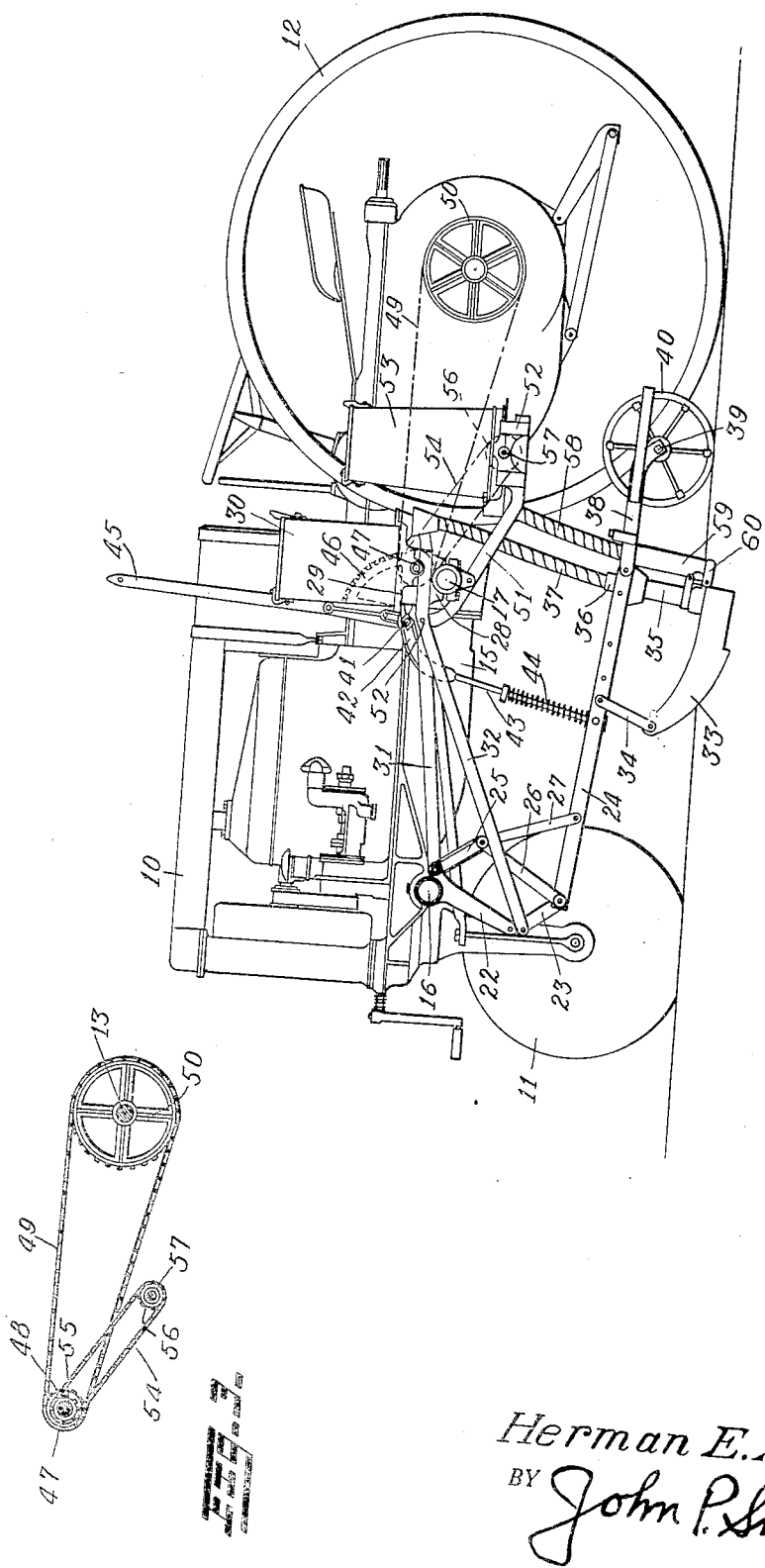
INVENTOR.
Herman E. Altgelt
BY John P. Smith.
ATTORNEY.

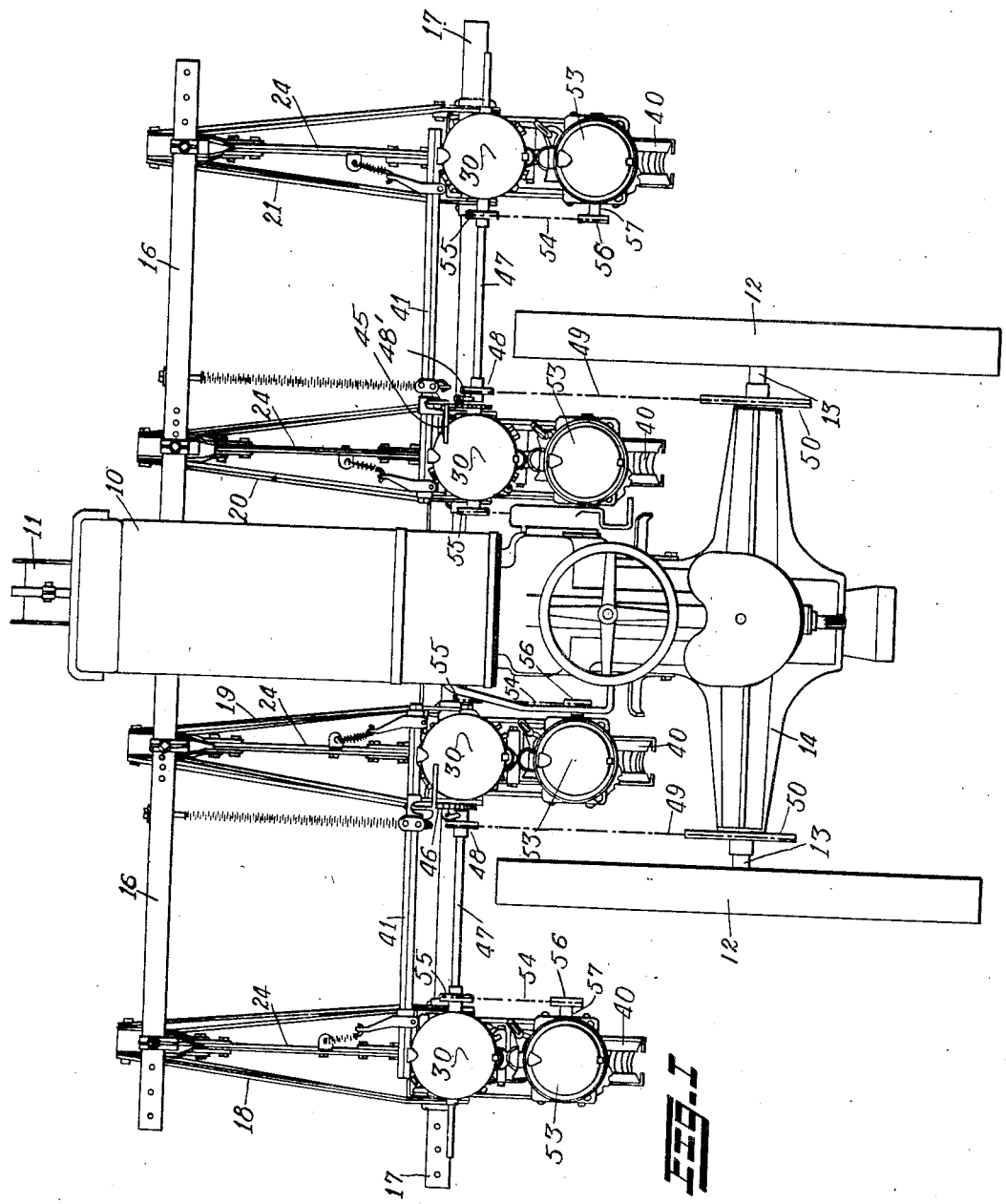

Patented Feb. 14, 1933

1,897,355

UNITED STATES PATENT OFFICE

HERMAN E. ALTGELT, OF SOUTH BEND, INDIANA, ASSIGNOR TO OLIVER FARM EQUIPMENT COMPANY, A CORPORATION OF DELAWARE

AGRICULTURAL IMPLEMENT

Application filed May 19, 1930. Serial No. 453,541.

This invention relates to an improvement in tractor implements and more particularly to improved supplemental planter or fertilizer attachment for a tractor planter.

One of the primary objects of the present invention is to provide in combination with a planting attachment for a tractor, a supplementary planter or fertilizer attachment associated therewith and carried by the tractor at the respective sides thereof; and with the feeding mechanism of each planter unit and its fertilizer attachment being operated from axle members of the tractor without interfering with the lifting and controlling mechanism for the planter units.

A still further object of the invention is to provide a novel and improved planting attachment for a tractor in which a supplementing planting attachment or a supplemental fertilizing attachment may be positioned on the opposite sides of the forward portion of the rear traction wheels of the tractor and in which a supplementing planting or fertilizing attachment is operatively driven through the drive mechanism which drives the main planting attachment.

These and other objects are accomplished by providing a construction and arrangement of the various parts in the manner hereinafter described and particularly pointed out in the appended claims.

Referring to the drawings:

Fig. 1 is a top plan view of a tractor showing a four row planting attachment on which my improved supplemental planting or fertilizing attachment is mounted;

Fig. 2 is a side elevational view of a tractor and implement showing my invention mounted thereon; and Fig. 3 is a fragmentary side elevational view showing the arrangement for driving the supplemental planting or fertilizing attachment.

The present invention is an improvement over my co-pending application, Serial No. 279,575 filed May 21, 1929.

In illustrating one form of my invention I have shown the same in connection with a tractor generally indicated by the reference character 10 which is provided with a single front steering wheel 11, rear spaced-apart traction wheels 12, secured to and operatively driven by the respective axle sections 13 which in turn are journaled in the rear axle housing 14 forming the rear frame portion of the main frame 15 of the tractor. Secured transversely of the tractor frame and positioned forwardly at a point slightly to the rear of the axle of the front wheel, is an implement supporting beam 16 which is preferably made of a pipe. A second beam is arranged transversely of the frame of the tractor and extends through an aperture at a point in the tractor frame adjacent the clutch housing. The second beam is generally indicated by the reference character 17. The specific manner of connecting the transverse implement supporting beams to the tractor does not constitute part of the present invention, the same being disclosed in my co-pending application filed March 19, 1928 and designated by the Serial No. 262,930.

In the embodiment of the invention shown in the drawings, four planting mechanisms or units generally indicated by the reference characters 18, 19, 20, and 21 are shown, two on each side of the tractor; and each of said mechanisms is anchored to the forward and rearward transverse beams carried by the tractor. The tractor planter is therefore adapted to plant four rows simultaneously and hence the transverse beams are of suitable length to accommodate four planter units, the outermost unit being located laterally beyond the lines of travel of the rear traction wheels. It will of course, be understood that a greater number of units may be employed and the anchor beams made longer to accommodate them, or a single planter unit may be employed at each side of the tractor. The respective end portions of these planter units are adjustably connected to the anchor beams 16 and 17 respectively, so that the units may be adjusted laterally to change the spacing of the planter units and hence the changing of the rows to be planted. The means for accomplishing this adjustment is specifically described and claimed in my first mentioned co-pending application and per se does not form any part of the present invention except in combination with the other parts hereinafter described.

It will be observed that the planter units as well as the supplemental planter units or fertilizing distributing attachment for each unit are of the same construction and a detailed description of one will suffice for all, but it may be here stated that when the planter units are arranged in sets, one set at each side of the tractor; the sets of units may be raised and lowered independently of each other.

Each primary planter unit includes an arm or hanger 22 rigidly, but transversely adjustably secured to the forward transverse anchor beam 16 and extends downwardly and somewhat forwardly therefrom. A link 23 is pivotally connected at one end of the lower portion of the hanger 22, and at the other end, said link 23 is loosely connected to the forward end portion of a beam 24. Links 25 are pivotally connected at their upper ends with the upper portion of the hanger 22 and extend downwardly and somewhat rearwardly therefrom, and the lower ends of the links 25 are connected with the lower portion of the link 23 through the medium of a link 26. The link 27 has its upper end connected to the upper end of the link 26 and its lower end connected to the beam 24 at a point spaced from the lower end of the link 26. It will be observed that the members or links 23, 25, 26 and the arm 22 form substantially a parallelogram for maintaining the beams substantially in the same position throughout their lifting movement.

Each planting unit also includes a bracket 28 rigidly secured to the rear transverse anchoring means 17. In effect this bracket 28 forms part of the seed can support 29 on which is mounted a seed can 30. Braces 31 and 32 are secured at their rear ends to the seed can supports or brackets 28 and at their forward ends to the upper and lower portions respectively of the hanger 22 and serve to brace the seed can supports as well as the hanger 22. These braces serve to prevent the transverse anchoring means 16 from twisting on account of the twisting strain which is placed upon the hanger 22.

In the drawings the rear or standard portion of the beam of each planting unit has secured thereto a furrow opener 33 which has its forward ends connected by means of a link 34 to the beams 24. The rear end of the shoe or furrow opener 33 is connected to the beams by means of a boot 35 which in turn is provided with a spout 36. The spout 36 is connected by a flexible tube 37 to the feeding mechanism of the seed can 30. Each of the planting units is provided with rearwardly extending arms 38 which have their forward ends secured to the beams 24. Journaled in the rearward part of the arms 38 as shown at 39, is a press or gauge wheel 40. These gauge wheels on each of these planting units regulate the depth penetration of the shoe so that all the planting is done at a uniform depth.

A shaft 41 has bearings in the seed can support 29 of the planting units of each set on the opposite sides of the tractor, and are provided with arms 42, the latter being connected through the medium of rods 43 to the rear portion of the beams 24. Springs 44 are mounted on each of the rods 43 for maintaining the beams downwardly under a resilient pressure. A hand lever 45 is secured to each of the shafts 41 inwardly of the line passing through the treads of the adjacent traction wheel. Each lever 45 is provided with a suitable detent for cooperation with a fixed segment 46.

A feed shaft 47 is common to the planting units of each set, and each shaft 47 has mounted thereon a sprocket wheel 48 which is operatively connected with its shaft 47 through the medium of a clutch mechanism 48' which in turn is operatively connected to and under the control of an adjacent lifting lever 45 in a manner well understood in the art. Trained about each sprocket wheel 48 is a drive chain 49 which is operatively driven by the drive sprocket 50 secured to each rear axle section 13 of the tractor. It will be understood that when one of the hand levers 45 is operated to lower one of the sets of planting units, the clutch mechanism controlled by that lever will be operated to connect the adjacent sprocket wheel 48 with its seed shaft so that the power will be imparted through the seed feeding mechanism for the planting unit of the set, and when the hand lever is reversely operated and the set of planting units raised, the seed feeding mechanism will be operatively disconnected from its propelling mechanism.

The primary feature of the present invention has to do with the positioning and operation of a supplemental planting or fertilizing attachment for the planting mechanism herein above described. This supplemental planting or fertilizing attachment is operatively driven from the primary planting units and is located in rearwardly alignment therewith. These attachments are located on the opposite sides of the tractor frame and are located in a vertical plane rearwardly passing through the forward portion of the rear traction wheels. These supplemental planting or fertilizing attachments may be adjusted in these positions without interfering with any of the operative parts of the tractor. It will of course be understood, that when four such planting units are used, two of these units are located outside the travel of the rear traction wheels. While primary invention has to do with a fertilizing attachment for the main planting units, it is sometimes found desirable to substitute a supplemental planting mechanism therefor so that seed such as beans or other seed may be planted with corn.

Each of these supplemental planting or fertilizing attachment units is supported on two rearwardly extending arms 51 and have their forward ends secured, as shown at 52, to the brace bars 32 and an intermediate portion secured with the seed can support 28. Mounted on the rear ends of the arms 51 is a supplemental seed or fertilizing can support 52, which in turn, has mounted thereon a seed or fertilizer can 53. It will of course, be understood that the usual seed feeding mechanism or fertilizing discharging mechanism is mounted in the can support 52. The mechanism of each can 53 is operatively driven by a chain 54 which is trained about a sprocket 55 secured to the feed shaft 47 of the main planting units. The rear end of chain 54 is trained about a sprocket 56 secured to the shaft 57 of the feed mechanism of the cans 53. The seed or fertilizing material in the can 53 is fed therefrom through a flexible tube 58 which in turn is connected to a boot 59 arranged rearwardly of the boot 35 of the main planting unit. This boot 59 may be connected in any suitable manner, but preferably by a collar 60 secured to the rear end of the shoe 33.

From the above description it will be seen that I have provided a very simple and efficient supplemental planting or fertilizing attachment for the primary planting unit which may be conveniently used in connection with a tractor attachment so that either two rows or more than two rows may be planted from the tractor with each of the supplemental planting or fertilizing distributing attachments operatively driven from the primary planting mechanisms. It will also be noted that these supplemental planting or fertilizing distributing attachments particularly the two adjacent to the tractor frame are arranged inwardly of each of the traction wheels and rearwardly of a vertical plane passing through the periphery of the forward portion of the traction wheel without interfering with the operating parts of the tractor, while the other supplemental planting or fertilizing attachments are arranged outside the traction wheels and rearwardly of a vertical plane passing through the forward portion of the periphery of the traction wheels.

While in the above specification I have described one embodiment which my invention may assume in practice, it will of course be understood that the same is capable of modification and that modification may be made without departing from the spirit and scope of my invention as expressed in the following claims.

What I claim is my invention and desire to secure by Letters Patent is:

1. In a tractor implement, the combination with a tractor, means for supporting a plurality of sets of planting units on the opposite sides of said tractor, planting mechanisms for each individual unit of the set, a drive shaft for each set of planting units, means for driving said shafts from the traction power of said tractor, a fertilizing attachment for each planting unit and means for driving each fertilizing mechanism from said drive shaft.

2. In a tractor implement, the combination with a tractor, of a plurality of planting units arranged in sets on the opposite sides of the tractor and supported therefrom, certain of said units located inwardly of the line of travel of traction wheels of said tractor, certain other of said planting units located outwardly of the line of travel for the traction wheels of said tractor, and a fertilizing attachment supported adjacent to each individual planting unit and located forwardly of the rear axis of the traction wheel and in a transverse plane within the periphery of the traction wheels.

3. In a tractor implement, the combination with a tractor having front steering and rear traction wheels, of a plurality of planting units located on the opposite sides thereof, said planting units supported by said tractor at a point rearwardly of the front steering wheel and forwardly of the axis of the rear traction wheel, and a ferilizing attachment for each planting unit and individually driven by said planting units.

4. In a tractor implement, the combination with a tractor having front steering and rear traction means, of a plurality of planting units located on the opposite sides of said tractor and supported at a point rearwardly of the front steering means and forwardly of the axis of the rear traction means, fertilizing attachments individual to each planting unit and supported adjacent thereto, means for driving the planting units from the rear axle of the tractor, and means for driving said fertilizing attachment from said planting unit, certain of said fertilizing attachments being located between the traction wheels and the tractor and certain other of said fertilizing attachments being located outside said traction wheels.

5. In a tractor implement, the combination with a tractor, of a forward beam secured to said tractor at a location rearwardly of the axis of the front wheel, a second beam secured to said tractor forwardly of the rear axis of the rear traction wheels, a plurality of planting units mounted on both of said beams, a seed can and seed feeding mechanism mounted on said second named beam, means for driving said feeding mechanism from the axle of the rear traction wheels, and a fertilizer discharging attachment supported by said rear beam and operatively related to said planting mechanism.

6. In a tractor implement, the combination with a tractor, a transverse beam secured to said tractor at a point adjacent to and rearwardly of the axis of the front wheel, a second beam secured to said tractor and arranged transversely with respect thereto, at a point forwardly of the axis of the rear traction wheel, a plurality of planting units mounted on the opposite sides of said tractor and attached to said beams, and fertilizing discharging mechanisms individual to and operatively related to each planting unit, said fertilizing mechanisms being located rearwardly of said planting unit and at a point rearwardly of the forward peripheral surface of each of said traction wheels.

7. In a tractor implement, the combination with a tractor, two transversely extending implement supporting beams located rearwardly of the axis of the front steering wheel and forwardly of the axis of rear traction means, a drive shaft for said planting mechanism, means for driving said shaft from the axle of the rear traction wheels, a fertilizing attachment mounted on each planting unit and located rearwardly thereof and forwardly of the axis of the rear traction wheel, a feeding mechanism for each fertilizing attachment and separate means for driving the feeding mechanism of each of said fertilizing attachments by said planting shaft.

8. In a tractor implement, the combination with a tractor, of a plurality of planting units located on the opposite sides of said tractor, drive shafts for each of said planting units, means for driving said shafts by the rear axle of said tractor, and fertilizing attachments individual to each of said planting units and operatively driven thereby, said planting units being located in the transverse plane intersecting the periphery of the rear traction wheels.

9. In a tractor implement, the combination with a tractor, of a plurality of planting units arranged in sets on the opposite sides of said tractor, means mounted on the opposite sides of said tractor for adjusting said units in sets, means for driving said planting units by the rear axle of said tractor, and fertilizing attachments for each of said units located rearwardly thereof and supported thereby, said fertilizing attachments being driven by said planter units, certain of said attachments being located between said traction wheels and the frame of said tractor and in a transverse plane intersecting the periphery of the traction wheels.

10. In a tractor implement, the combination with a tractor, having front steering means and rear traction means, a transverse implement supporting beam secured to said tractor at a point adjacent to and rearwardly of the front steering means, a second implement supporting beam secured to said frame and extending transversely at a point forwardly of the rear traction means, a plurality of planting units attached to said beams including a plurality of seed cans mounted on said second named beam, a drive shaft for said planter units, means for driving said drive shaft by the rear axle of said tractor, a fertilizing attachment individual to each planting unit supported by said rear beam at a point below and rearwardly of the planting mechanism and a feed shaft individual to each fertilizing mechanism and operatively driven by the drive shraft for said planting mechanism, said fertilizing mechanisms being located on the vertical plane intersecting the periphery of said rear traction means.

11. In a tractor implement, the combination with a tractor, of a planting unit at each side of the tractor, means projecting laterally from the tractor for supporting the planter unit thereon, means for driving said planter unit from the traction power of the tractor, and supplemental dispensing attachments positioned adjacent said planting unit and operatively driven thereby.

12. In a tractor implement, the combination with a tractor, means for supporting a plurality of separate planting units on the opposite sides of said tractor, planting mechanism for each individual unit of the set, a drive shaft for each set of the planting units, means for driving said shafts from the traction power of said tractor, a supplemental dispensing attachment for each planting unit, and separate means for driving each supplemental dispensing mechanism from said drive shaft.

In testimony whereof I have signed my name to this specification, on this 14th day of May A. D. 1930.

HERMAN E. ALTGELT.